(12) United States Patent
Li

(10) Patent No.: US 10,891,715 B2
(45) Date of Patent: Jan. 12, 2021

(54) DEEP NEURAL NETWORK FOR IMAGE ENHANCEMENT

(71) Applicant: Continental Automotive Systems, Inc., Auburn Hills, MI (US)

(72) Inventor: Dalong Li, Rochester Hills, MI (US)

(73) Assignee: Continental Automotive Systems, Inc., Auburn Hills, MI (US)

(*) Notice: Subject to any disclaimer, the term of this patent is extended or adjusted under 35 U.S.C. 154(b) by 127 days.

(21) Appl. No.: 16/138,496

(22) Filed: Sep. 21, 2018

(65) Prior Publication Data

US 2019/0096032 A1 Mar. 28, 2019

Related U.S. Application Data

(60) Provisional application No. 62/562,004, filed on Sep. 22, 2017.

(51) Int. Cl.
| | |
|---|---|
| *G06T 3/40* | (2006.01) |
| *H04N 5/232* | (2006.01) |
| *G06T 5/50* | (2006.01) |
| *H04N 7/18* | (2006.01) |

(52) U.S. Cl.
CPC .......... *G06T 3/4007* (2013.01); *G06T 3/4046* (2013.01); *G06T 3/4053* (2013.01); *G06T 5/50* (2013.01); *H04N 5/23232* (2013.01); *H04N 7/18* (2013.01); *G06T 2207/20084* (2013.01); *H04N 7/181* (2013.01)

(58) Field of Classification Search
CPC ... G06T 3/4007; G06T 3/4046; G06T 3/4053; G06T 5/50; H04N 5/23232; H04N 7/18
See application file for complete search history.

(56) References Cited

U.S. PATENT DOCUMENTS

| | | | |
|---|---|---|---|
| 10,630,996 B2 * | 4/2020 | Wang | H04N 19/31 |
| 2013/0051519 A1 * | 2/2013 | Yang | G06T 11/005 378/19 |
| 2017/0256033 A1 * | 9/2017 | Tuzel | G06K 9/00255 |
| 2018/0139458 A1 * | 5/2018 | Wang | H04N 19/154 |
| 2018/0293706 A1 * | 10/2018 | Viswanathan | G06T 3/4092 |
| 2020/0014904 A1 * | 1/2020 | Wetzstein | H04N 13/128 |

\* cited by examiner

*Primary Examiner* — Utpal D Shah

(57) ABSTRACT

A method for generating a super-resolved high-resolution image based on a low-resolution image is provided. The method includes receiving a low-resolution image having a first image size from a camera, and determining an interpolated image of the low-resolution image. The interpolated image has a second image size being greater than the first image size. The method also includes determining a high-resolution super-resolved image based on the interpolated image and model data. The model data is stored on memory hardware. The method also includes displaying, on a user interface, the high-resolution super-resolved image.

14 Claims, 10 Drawing Sheets

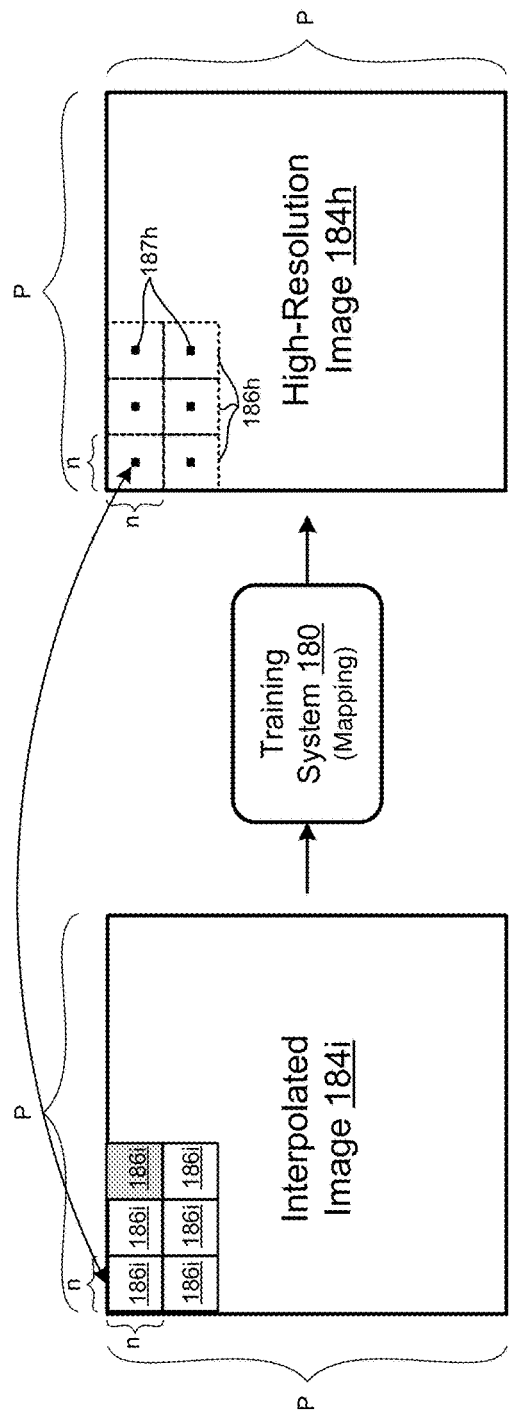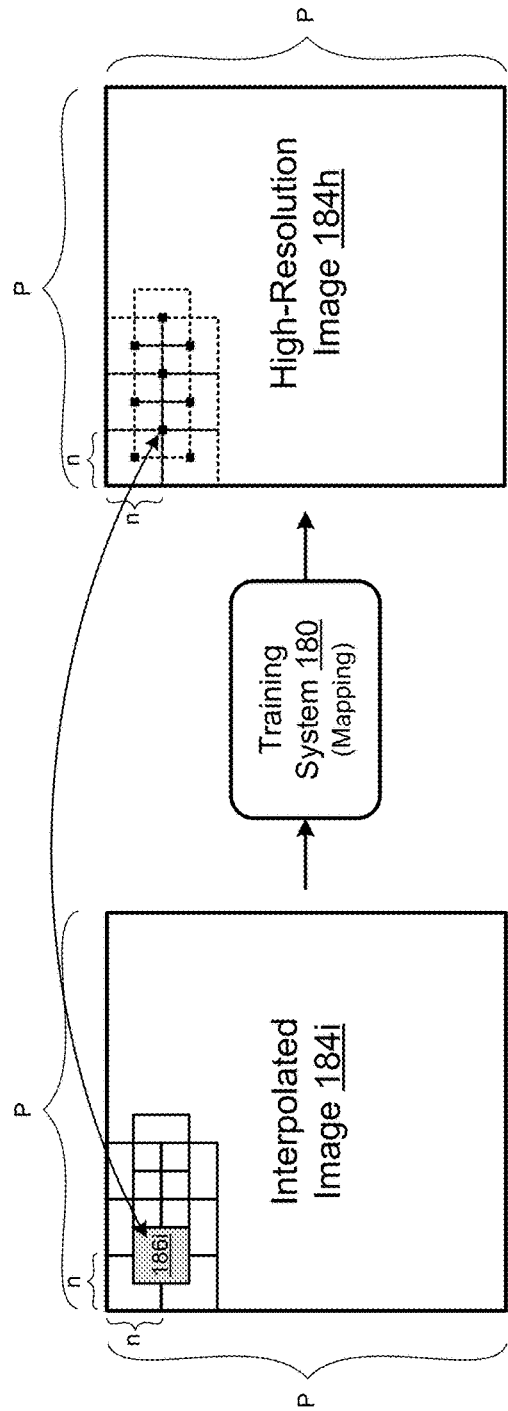
FIG. 2C
FIG. 2D

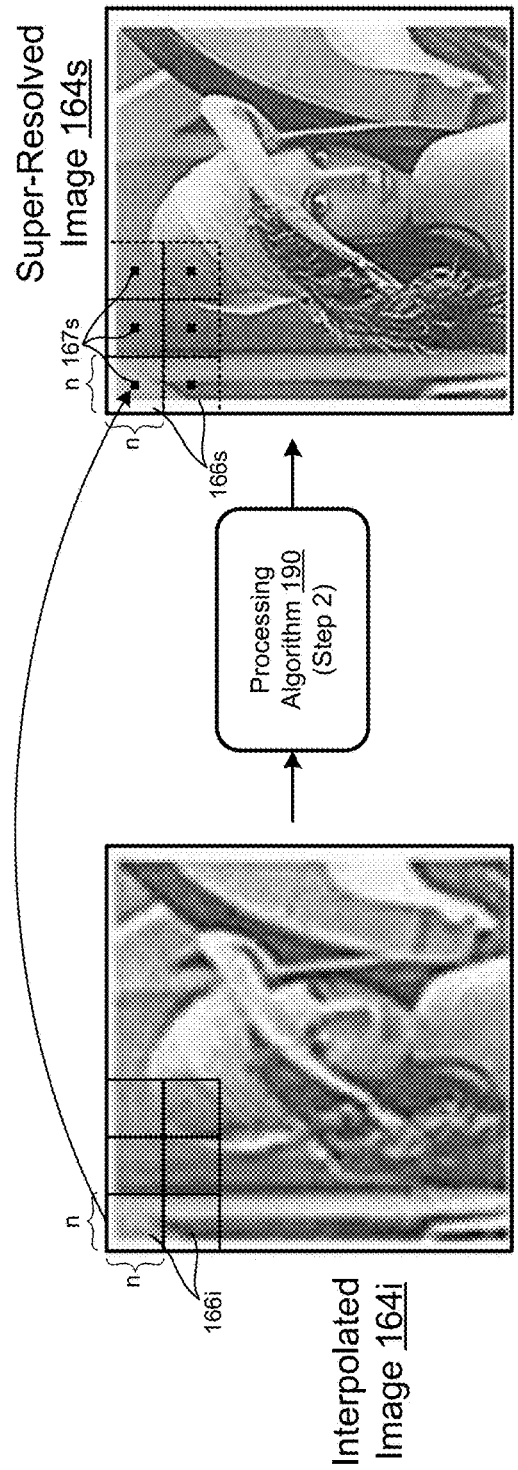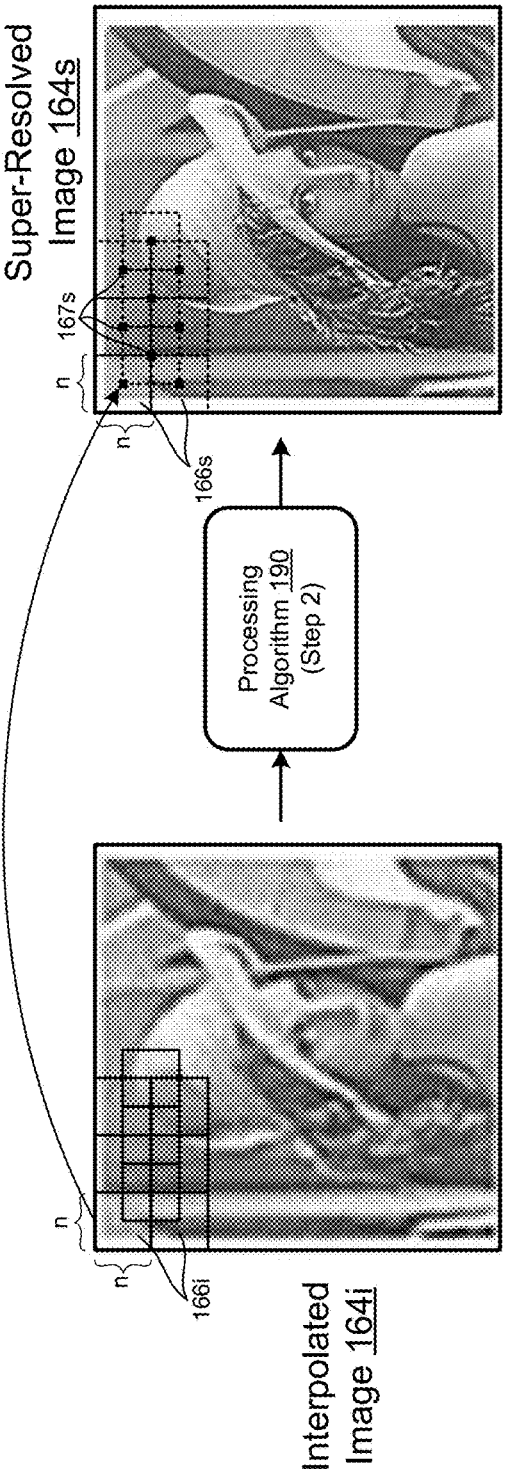

500

Receiving, At Data Processing Hardware (e.g., DNN), A Low-resolution Image Having A First Image Size From A Camera In Communication With The Data Processing Hardware
502

Determining, At The Data Processing Hardware, An Interpolated Image Of The Low-resolution Image, The Interpolated Image Having A Second Image Size Being Greater Than The First Image Size
504

Determining, At The Data Processing Hardware, A High-resolution Super-resolved Image Based On The Interpolated Image And Model Data, The Model Data Stored On Memory Hardware In Communication With The Data Processing Hardware
506

Displaying, On A User Interface In Communication With The Data Processing Hardware, The High-resolution Super-resolved Image
508

FIG. 5

DEEP NEURAL NETWORK FOR IMAGE ENHANCEMENT

TECHNICAL FIELD

This disclosure relates to a deep neural network trained to enhance an image.

BACKGROUND

Automobile safety has been a concern of the automotive industry. Recent advancements in technology have led to improved safety systems for vehicles. Arrangements and methods for detecting and avoiding collisions are becoming available. Sensors and cameras located on the vehicle may be used to alert a driver of possible obstacles when the vehicle is traveling in a forward direction or a rearward direction. Therefore, it is desirable to have a safety system that is capable of detecting obstacle and objects near or around a vehicle and alert the driver of the detected obstacles and objects.

SUMMARY

One aspect of the disclosure provides a method for generating a super-resolved high-resolution image based on a low-resolution image. The method includes receiving, at data processing hardware, a low-resolution image having a first image size from a camera in communication with the data processing hardware. The method includes determining, at the data processing hardware, an interpolated image of the low-resolution image. The interpolated image has a second image size that is greater than the first image size. The method also includes determining, at the data processing hardware, a high-resolution super-resolved image based on the interpolated image and model data. The model data is stored on memory hardware in communication with the data processing hardware. The method includes displaying, on a user interface in communication with the data processing hardware, the high-resolution super-resolved image.

Implementations of this aspect of the disclosure may include one or more of the following optional features. In some implementations, the model data includes neural network weights and biases along with other neural network parameters.

The method may further include generating the model data at the data processing hardware. In some examples, generating the model data includes: receiving one or more high-resolution test images; downsizing the one or more high-resolution test images into a low-resolution test image having a low-resolution image size that is less than an image size of the one or more test high-resolution images; and interpolating the one or more low-resolution images into one or more interpolated images having an interpolated image size that is equal to the image size of the one or more high-resolution test images. In addition, generating the model data includes mapping an interpolated sub-image of the interpolated image having a number of pixels to a pixel of a test sub-image of the high-resolution test image, and generating the model data comprising mapped data of the interpolated sub-image to the pixel of the test sub-image. Mapping the interpolated sub-image to a pixel of the test sub-image may include dividing the interpolated image into interpolated sub-images and dividing the high-resolution test image into test sub-images. Mapping the interpolated sub-image to a pixel of the of the test sub-image may also include, for each interpolated sub-image: determining a complementary test sub-image having a location within the high-resolution test image being the same location as a location of the interpolated sub-image within the interpolated image; and mapping the interpolated sub-image to one pixel of the complementary test sub-image. In some examples, the one pixel of the test sub-image is positioned in the center of the test sub-image.

In some implementations, the data processing hardware is supported by a vehicle. The second image size of the interpolated image may be double the first image size of the low-resolution image. The data processing hardware may include a neural network.

Another aspect of the disclosure provides a system for generating a super-resolved high-resolution image based on a low-resolution image. The system includes a user interface, data processing hardware in communication with the user interface, and memory hardware in communication with the processing hardware. The memory hardware stores instruction that when executed cause the data processing hardware to execute the method described above.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 2A is a schematic view of a training system receiving high-resolution images and outputting model data based on the received high-resolution images.

FIGS. 2B-2E are schematic views of exemplary interpolated images mapped to high-resolution images.

FIGS. 3C and 3D are schematic views of exemplary super-resolved images generated from low-resolution image based on the process of FIG. 3A.

FIG. 5 is a schematic view of an exemplary arrangement of operations for a method that generates a super-resolved high-resolution image based on a low-resolution image Like reference symbols in the various drawings indicate like elements.

DETAILED DESCRIPTION

Vehicle safety is of great concern to everyone. In some examples, the vehicle may be equipped with cameras that capture low-resolution images. Therefore, it is desirable for a vehicle to have a system capable of receiving a low-resolution image of an obstacle or object and process the received low-resolution image to generate a high-resolution super-resolved image that is able to identify the obstacle or object and alert the driver of the obstacle or object. In addition, it is also desirable that the system is able to use the super-resolved images to improve the localization of the vehicle by comparing one or more of the one or more obstacle or objects with a map that includes the one or more obstacles or objects.

Figure 1A:
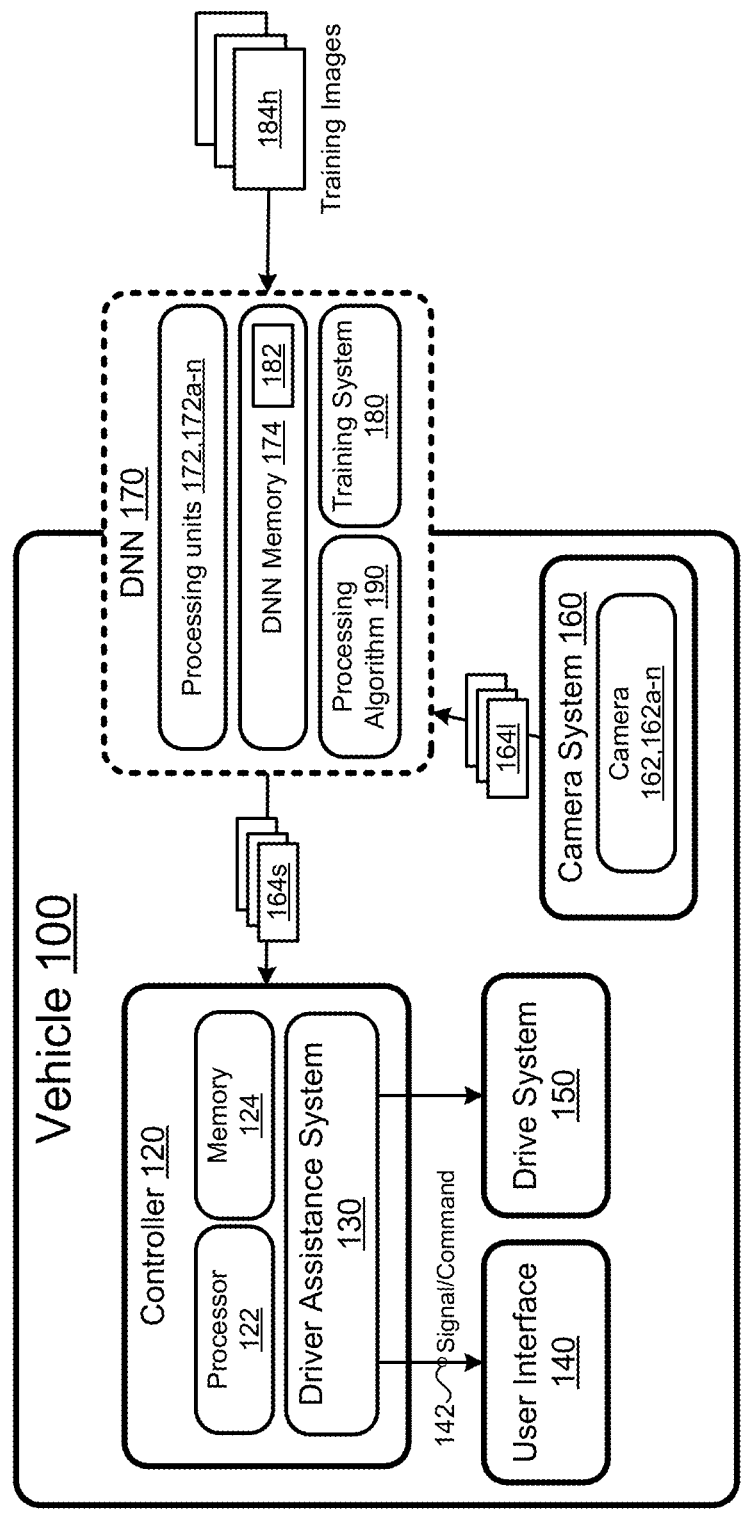
FIGS. 1A-1C are schematic views of exemplary vehicles including a deep neural network.
Figure 1B:
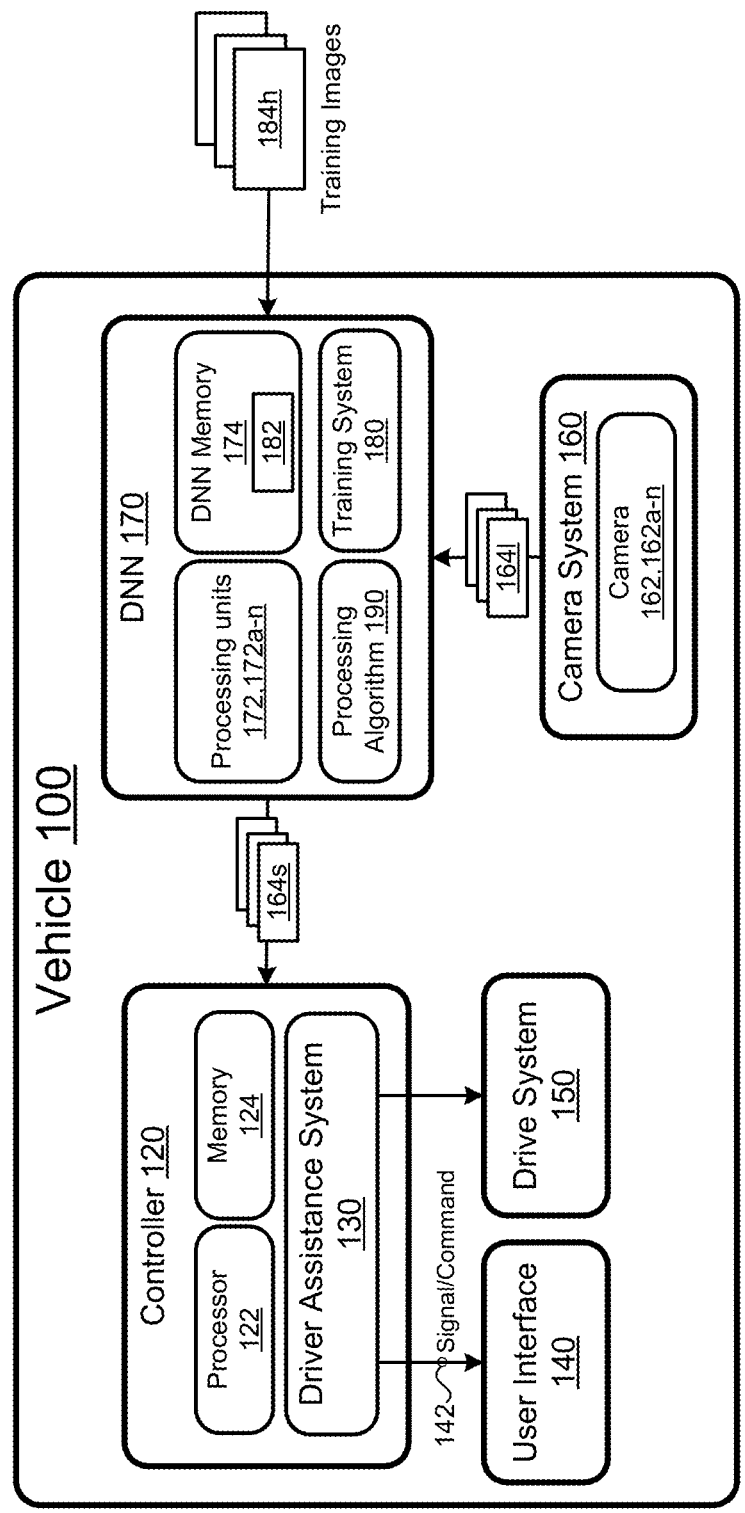
Figure 1C:
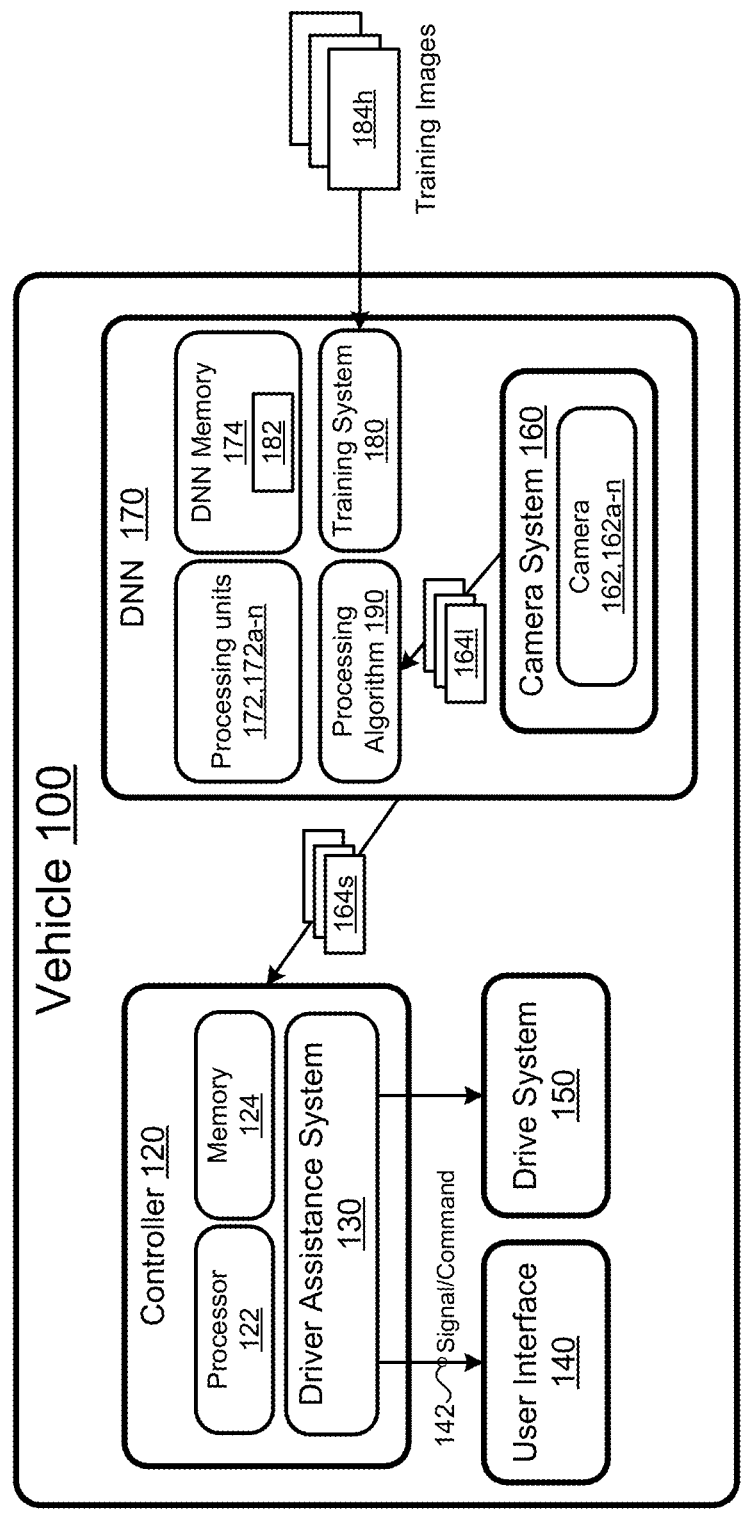

Referring to FIGS. 1A-1C, in some implementations, a vehicle 100 includes a vehicle controller 120 that includes a computing device or processor (e.g., processor hardware) 122 (e.g., central processing unit having one or more computing processors) in communication with non-transitory memory 124 (e.g., a hard disk, flash memory, random-access memory, memory hardware) capable of storing instructions executable on the computing processor(s)). The vehicle controller 120 executes a driver assistance system 130 on the computing device 122. The driver assistance system 130 is configured to alert the driver of one or more obstacles or objects in front of the vehicle, behind the vehicle, or adjacent to the vehicle 100. In some examples, the vehicle 100 is a semi-autonomous or autonomous vehicle. In this case, the driver assistance system 130 is configured to autonomously or semi-autonomously maneuver the vehicle.

The driver assistance system 130 is in communication with a user interface 140 configured to display an image or alert to the driver. The user interface 140 may include an instrument panel display (not shown) that is part of an instrument panel of the vehicle 100 or may be separate from the instrument panel, for example, a heads-up-display (HUD) or a display screen supported by a dashboard of the vehicle 100. The display screen may be positioned in a center portion of the dashboard and may be used for displaying images from a rear view camera, displaying maps for navigation, displaying vehicle and/or audio visual settings. The user interface may be a touch screen that allows the driver to touch the screen for interacting with the user interface 140, while in other examples, the user interface 140 is configured to receive a driver input from one or more sources, such as but not limited to, an input keyboard, a rotary dial, one or more keys on a steering wheel supported by the dashboard, and a microphone.

The vehicle controller 120 is also in communication with a drive system 150 that allows the vehicle 100 to drive on a road surface. The drive system 150 includes wheels, such as, front left/right wheels and back left/right wheels. The drive system 150 may also include brakes associated with the wheels for stopping the wheels from rotating or slowing the wheels down. In some examples, when the driver assistance system 130 determines that there is an object or obstacle within the path of the vehicle 100, the vehicle controller 120 issues a command to the drive system 150 causing the vehicle 100 to take an action, such as, but not limited to, slowing down, stopping, or changing direction to avoid the object.

The vehicle 100 includes a camera system 160 that includes one or more imaging devices such as cameras 162, 162a-n configured to capture images of the environment of the vehicle 100. The one or more cameras 162, 162a-n may be positioned on a front portion of the vehicle 100, a rear portion of the vehicle 100, or side portions of the vehicle 100. Moreover, the cameras 162, 162a-n may be facing upward to capture street signs and street signals and/or downwards to capture adjacent objects and obstacles. In some examples, the camera system 160 is a standalone system in communication with one or more other vehicle systems, such as, but not limited to the DNN 170. In other examples, the DNN 170 is part of the camera system 160.

In some implementations, the vehicle 100 includes one or more Neural Networks (NN) 170, for example, a Deep Neural Network (DNN), configured to receive one or more low-resolution images 164*l* from the camera system 160 and process the received low-resolution images 164*l* providing a high-resolution super-resolved image 164*s*. DNNs 170 are computational approaches used in computer science, among other disciplines, and are based on a large collection of neural units, loosely imitating the way a biological brain solves problems with large clusters of biological neurons connected by axons. DNNs 170 are self-learning and trained, rather than programmed, and excel in areas where the solution feature detection is difficult to express in a traditional computer program.

In a training phase, the DNN 170 receives training images 184*h* and interprets the training images 184*h*. From the interpolated image 184*i* (that are based on the high-resolution training image 184*h*), the interpolated image 184*i* are divided into patches 186*i* (i.e., sub-images), the patches 186*i* can be overlapped. The patches 186*i* are the inputs to the DNN 170 and the outputs (labels) are the corresponding central pixel values 187*h* of the patches 186*i* on the high-resolution images 184*h*. Unlike most of machine learning problems, no manual labelling is needed. Once the DNN 170 is trained, in the training phase, using training images 184*h*, the DNN 170 can then receive low-resolution images 164*l* from the vehicle camera system 160 and process the images 164*l* using the model data 182 providing the high-resolution super-resolved image 164*s* on a pixel to pixel basis. The training system 180 includes determining weights and biases, i.e., model data 182. The described system is particularly suitable for GPU since the described algorithm is parallel in nature.

The DNN 170 includes multiple layers of nonlinear processing units 172, 172a-n in communication with DNN non-transitory memory 174. The multiple layers of nonlinear processing units 172 may include one or more graphics processing units (GPUs) that are configured to rapidly manipulate and alter the DNN non-transitory memory 174 to accelerate the creation and processing of images. The DNN non-transitory memory 174 stores instructions that when executed on the nonlinear processing units 172 cause the DNN 170 to provide the super-resolved image 164*s*. Each nonlinear processing unit 172, 172a-n is configured to transform the low-resolution image 164*l* using the model data 182 that includes parameters that are learned through training. A series of transformations from the low-resolution image 164*l* to the high-resolution image 164*s* occurs at the multiple layers of the nonlinear processing units 172, 172a-n. Therefore, the DNN 170 is configured to execute a training system 180 which results in determining a processing algorithm 190 based on the collected DNN model 182. Once the DNN 170 determines the weights and biases (i.e. DNN model 182), the DNN 170 is able to receive a low-resolution image 164*l* from the vehicle camera system 160 and generate a high-resolution super-resolved image 164*s* using the DNN model 182. In some implementations, as shown in FIGS. 1A and 1B, the DNN 170 and camera system 160 are separate systems; while in other implementations, as shown in FIG. 1C, the camera system 160 and the DNN 170 are the same system.

The training system 180 generates the DNN model 182 based on received high-resolution training images 182*h* and stores the DNN model in the DNN memory 174. As shown in FIG. 1A, the training system 180 is located outside of the vehicle 100. In this case, the training system 180 receives high-resolution images 184*h* (e.g., test images), for example, images previously captured, and outputs DNN model 182 used by the processing algorithm 190 positioned in the vehicle 100. Moreover, as shown, the DNN 170 includes processing units 172, 172a-n that are supported by the vehicle 100 and others that are separate from the vehicle 100. The processing units 172, 172a-n supported by the vehicle 100 execute the processing algorithm 190 that uses the DNN model 182, while the processing units 172, 172a-n that are not supported by the vehicle 100 execute the training system 180.

As shown in FIGS. 1B and 1C, the training system 180 is part of the vehicle 100. In this case, the training system 180 the training images 184h are images captured from the camera system 160, and the DNN 170 selects the images that are high-resolution, i.e., the DNN 170 goes through a selection process to one select high-resolution images because some of the captured images may be blurry due to the vehicle moving and/or due to out of focus blur.

Figures 2A, 2B:
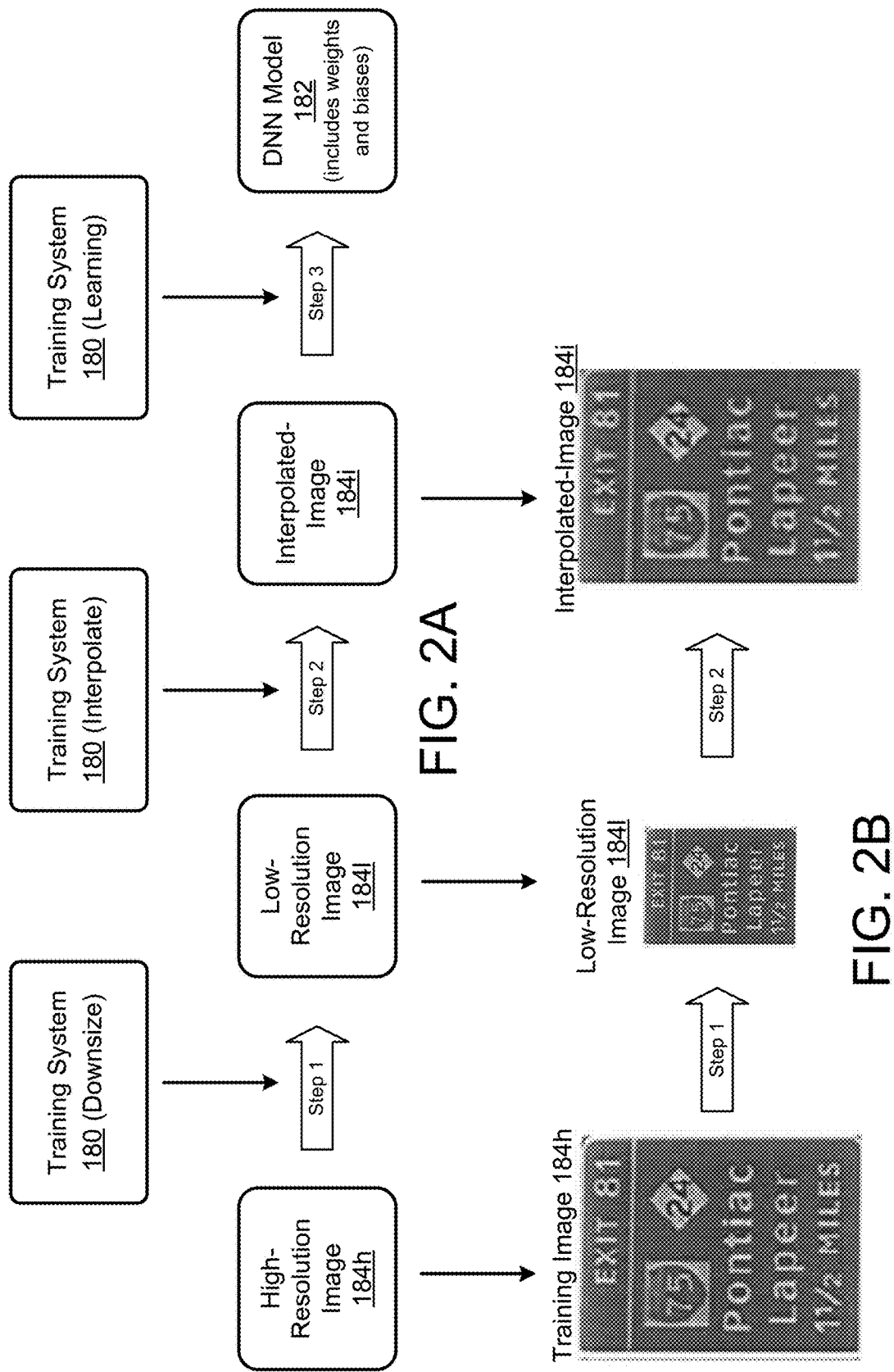

Referring to FIGS. 2A and 2B, the training system 180 receives the high-resolution images 184h and in a first step, downsizes the received high-resolution images 184h to a down-sized low-resolution image 184l that is smaller in size than the corresponding received high-resolution image 184h. In some examples, the high-resolution image 184h is downsized by a factor of two. The training system 180 may use any method to downsize the received high-resolution image 184h to the down-sized low-resolution image 184l.

At a second step, the training system 180 up-scales the low-resolution image 184l by interpolation, resulting in an interpolated image 184i that is of the same size as the high-resolution image 184h, i.e., the number of pixel of the interpolated image 184i is the equal to the number of pixels of the high-resolution image 184h. Therefore, the high-resolution image 184h and the interpolated image 184i each has a pixel size of P by P pixels (see FIGS. 2B-2E). The training system 180 may use one or more image interpolation processes to interpolate the low-resolution image 184l. The interpolated image 184i is blurry compared to the high-resolution image 184h because the interpolated image 184i assumes that images are locally smoothed and the smooth interpolation function removes high frequency details from images.

Figure 2E:
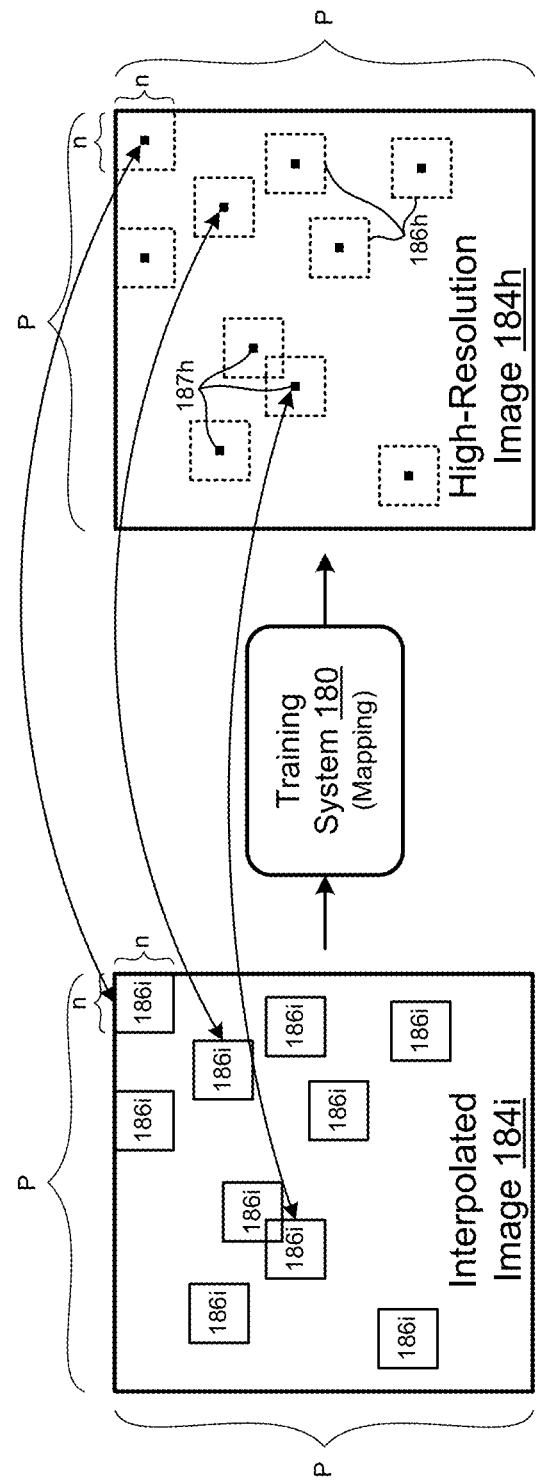

At a third step, the training system 180 maps pixels of the interpolated image 184i with a pixel associated with the high-resolution image 184h, resulting in the training system 180 generating the DNN model 182. Referring to FIG. 2B showing the interpolated image 184i and the high-resolution image 184h, the training system 180 divides the interpolated image 184i and the high-resolution image 184h into multiple patches or sub-images 186i, 186h respectively, each sub-image 186i, 186h having a size n by n pixels. In some examples, the interpolated image 184i and the high-resolution image 184h are divided into 7 by 7 pixels (i.e., 49 sub-image vector input), or 27 by 27, or any other odd size sub-image 186i, 186h. In some examples, the size of each sub-image 186i is a parameter that can be adjusted. Each one of the sub-images 186i of the interpolated images 184i is mapped to a single pixel 187h of the high-resolution image 184h, where the single pixel 187h is located at the center of a similarly positioned sub-image 186h with respect to the high-resolution image 184h. Therefore, the training system 180 executes a mapping function that maps a sub-image 186i of pixels associated with an interpolated image 184i to a single pixel 187h associated with a corresponding high-resolution image 185h. The mapping may occur on sub-images 186i of the interpolated image 184i being adjacent to one another as shown in FIG. 2C, or overlapping sub-images 186i as shown in FIG. 2D. Referring to FIG. 2E, in some implementations, the sub-images 186i associated with each interpolated image 184i may be selected and/or not every sub-image 186i within the interpolated image 184i selected for mapping to a corresponding sub-image of the high-resolution image 184h. The selection of each patch 186i may be based on contrast of the patch 186i measured by variance.

In some examples, the DNN 170 selects a patch 186i if the variance of the patch 186i is large enough because a flat region of the image 184i associated with the patch 186i does not have much high frequency information needed to be recovered anyway. Additionally or alternatively, in some examples, the sub-images 186i within an image 184i can overlap.

Once the training system 180 receives and analyzes a number of high-resolution images 184h and maps sub-images 186i of the interpolated image 184i to corresponding sub-images 186h of the high-resolution image 184h, the training system 180 stores the mapped data as the DNN model 182 in the memory hardware 174 of the DNN 170.

Figure 3A:
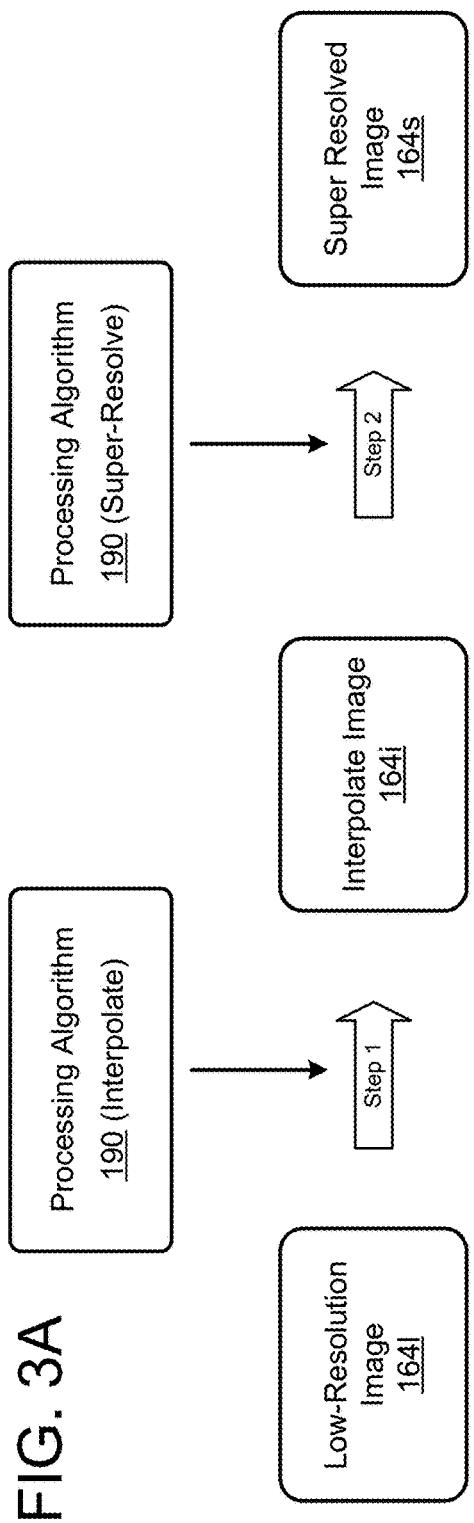
FIG. 3A is a schematic view of an exemplary process for generating a super-resolved image from a low-resolution image on model data.
Figure 3B:
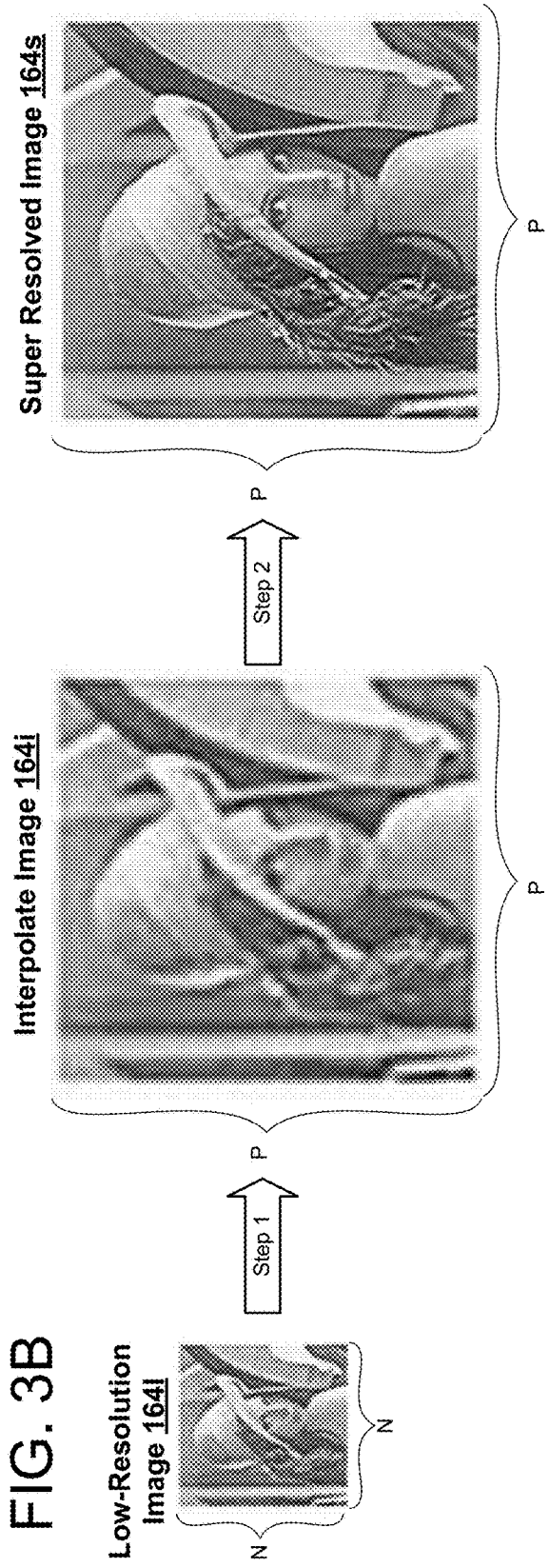
FIG. 3B is a schematic view of an exemplary super-resolved image generated from a low-resolution image based using the process of FIG. 3A.

The processing algorithm 190 is configured to receive a low-resolution image 164l captured by one or more cameras 162, 162a-n of the vehicle and determine a high-resolution super-resolved image 164s based on the received low-resolution image 164l using the DNN model 182. Referring to FIGS. 3A and 3B, the processing algorithm 190 receives the low-resolution image 164l captured by the one or more cameras 162, 162a-n of the vehicle 100. The processing algorithm 190, at a first step, interpolates the received low-resolution image 164l to an interpolated image 164i having a desired size being larger than the low-resolution image 164i, for example, the low-resolution image 164i has a size of N by N pixels, and the interpolated image 164i has a size of P by P pixels, where P>N. The processing algorithm 190 may use one or more interpolation techniques that include, but are not limited to, bicubic interpolation, linear kernel regression, or any other interpolation techniques. In some examples, the interpolated image 164i is double the size of the low-resolution image 164l. At a second step, the processing algorithm 190 super-resolves the interpolated image 164i using the DNN model 182 and generates a high-resolution super-resolved image 164s. Therefore, referring to FIG. 3B, the low-resolution image 164l has a size of N by N pixels, the interpolated image 164i and the super-resolved image 164s both have the same size being P by P pixels.

Referring to FIG. 3C, the processing algorithm 190 super-resolves the interpolated image 164i by first dividing the low-resolution interpolated image 164i into overlapping patches, blocks, or sub-images 166i, each having a size being n by n pixels. For each sub-image 166i of the interpolated image 164i, the processing algorithm 190 generates a pixel 167s in the super-resolved image 164s based on the DNN model 182. The generated pixel 167s is positioned at a corresponding sub-image 166s of the super-resolved image 164s and positioned at the center of the sub-image 166s associated with the super-resolved image 164s. Therefore, every pixel 167s generated in the super-resolved image 164s is determined by executing the processing algorithm 190 on a sub-image 166i of the interpolated image 164i. To generate the super-resolved image 164s, every sub-image 166i of the interpolated image 164i is processed. Moreover, as shown in FIG. 3D, overlapping sub-images 166i of the interpolated image 164i are processed to generate every pixel 167s of the super-resolved image 164s.

Figure 4:
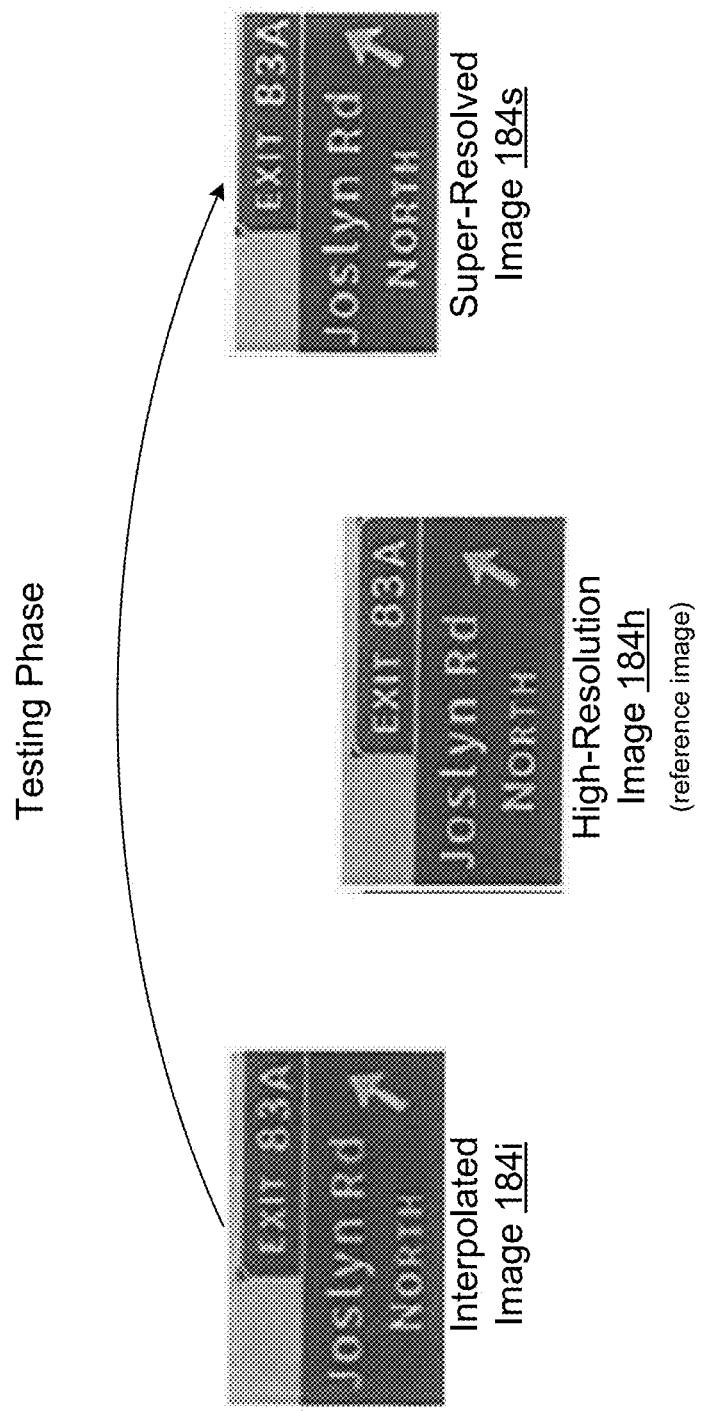
FIG. 4 is a schematic view of an exemplary image during a testing phase.

Referring to FIG. 4, in some implementations, the DNN 170 may execute a testing phase to verify that an interpolated image 184i that is super-resolved 184s, is as close to the actual high-resolution image 184h. The testing phase may be executed before the deployment phase described in FIGS. 3A-3D to fine tune and improve the DNN model 182. Therefore, the DNN 170 receives a low-resolution image 184l of the high-resolution image 184h, and determines the super-resolved image 184s as described in FIGS. 3A-3D. Then, the DNN 170 compares the determined super-resolved image 184s with the original high-resolution image 184h and improves the DNN model 182, thus improving the processing algorithm 190. As such and as previously described, the DNN 170 is a self-learning system.

The system described above may be used to improve driver safety by identifying objects that are stationary or moving, for example an object positioned at a far distance. In such case, the low-resolution camera captures the low-resolution image 164l of the object and the DNN 170 identifies the object. In some examples, the DNN memory 174 may store a map of a specific location, and the DNN 170 may identify objects, such as, but not limited to, street signs, known points of interest, and determine the location of the vehicle 100 using the identified objects and the stored map. As such, the vehicle 100 may improve its localization, especially when the GPS (Global positioning system) is not accurate. Other uses of the system may include, identifying people and objects while moving, improving camera quality by using a low-resolution camera to capture images but processing the captured images to generate high-resolution images. The system may also be used to improve the rear view camera images.

FIG. 5 shows an exemplary arrangement of operations for a method 500 that generates a high-resolution super-resolved image 164s based on a received low-resolution image 164l received from a camera 162, 162a-n supported by a vehicle 100, according to FIGS. 1A-4. At block 502, the method 500 includes receiving, at data processing hardware 172, 172a-n, a low-resolution image 164l from the camera 162, 162a-n. The camera 162, 162a-n being in communication with the data processing hardware 172, 172a-n. In some examples, the data processing hardware 172, 172a-n is a processor of a DNN 170. The low resolution image 164l has a first image size of N by N pixels, as shown in FIG. 3B. At block 504, the method 500 includes determining, at the data processing hardware 172, 172a-n, an interpolated image 164i of the low-resolution image 164l. The interpolated image 164i having a second image size of P by P pixels being greater than the first image size of N by N pixels. With reference to FIG. 3B, the interpolated image 164i may be double the size of the low-resolution image 164l.

At block 506, the method 500 includes determining, at the data processing hardware 172, 172a-n, a high-resolution super-resolved image 164s based on the interpolated image 164i and DNN model 182 (e.g., model data). The DNN model 182 is stored on memory hardware 174 in communication with the data processing hardware 172, 172a-n.

At block 508, the method 500 includes displaying, on a user interface 140 in communication with the data processing hardware 172, 172a-n, the high-resolution super-resolved image 164s. In some examples, the DNN model 182 includes neural network weights and biases along with other neural network parameters.

In some implementations, the method 500 further includes generating, at data processing hardware 172, 172a-n, the DNN model 182 by: receiving one or more high-resolution test images 184h; downsizing the one or more high-resolution test images 184h into a low-resolution test image 184l having a low-resolution image size that is less than an image size of the one or more high-resolution test images 184h; and interpolating the one or more low-resolution images 184l into one or more interpolated images 184i having an interpolated image size that is equal to the image size of the one or more high-resolution test images 184h. Generating the DNN model further includes mapping an interpolated sub-image 186i of the interpolated image 184i having a number of pixels (e.g., n by n) to a pixel 187h of a test sub-image 186h of the high-resolution test image 184h; and generating the DNN model 182 comprising mapped data of the interpolated sub-image 186i to the pixel 187h of the test sub-image 186h. In some implementations, mapping the interpolated sub-image 186i of the interpolated image 184i having to the pixel 187h of the test sub-image 186h, includes: dividing the interpolated image 184i into interpolated sub-images 186i; and dividing the high-resolution test image 184h into test sub-images 186h. In addition, for each interpolated sub-image 186i: determining a complementary test sub-image 186h having a location within the test image 184h being the same location as a location of the interpolated sub-image 186i within the interpolated image 184i; and mapping the interpolated sub-image 186i to the one pixel 187h of the complementary test sub-image 186h. In some examples, the one pixel 187h of the test sub-image 186h is positioned in the center of the test sub-image 186h.

Various implementations of the systems and techniques described here can be realized in digital electronic circuitry, integrated circuitry, specially designed ASICs (application specific integrated circuits), FPGA (field programmable gate array), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims.

What is claimed is:

1. A method for generating a super-resolved high-resolution image based on a low-resolution image, the method comprising:
   during a training phase:
      receiving, at data processing hardware, one or more high-resolution test images;
      downsizing, at the data processing hardware, the one or more high-resolution test images into a low-resolution test image having a low-resolution image size that is less than an image size of the one or more test high-resolution images;
      interpolating, at the data processing hardware, the one or more low-resolution images into one or more interpolated images having an interpolated image size that is equal to the image size of the one or more high-resolution test images;
      mapping, at the data processing hardware, an interpolated sub-image of the interpolated image having a number of pixels to a pixel of a test sub-image of the high-resolution test image;
      generating, at the data processing hardware, a model data comprising mapped data of the interpolated sub-image to the pixel of the test sub-image; and
      storing, at memory hardware in communication with the data processing hardware, the model data; and
   during an execution phase:
      receiving, at data processing hardware, a low-resolution image having a first image size from a camera in communication with the data processing hardware;
      determining, at the data processing hardware, an interpolated image of the low-resolution image, the interpolated image having a second image size being greater than the first image size;
      determining, at the data processing hardware, a high-resolution super-resolved image based on the interpolated image and the stored model data; and
      displaying, on a user interface in communication with the data processing hardware, the high-resolution super-resolved image.

2. The method of claim 1, wherein the model data comprises neural network weights and biases along with other neural network parameters.

3. The method of claim 1, wherein mapping the interpolated sub-image to a pixel of the test sub-image, further comprises:
   dividing the interpolated image into interpolated sub-images;
   dividing the high-resolution test image into test sub-images;
   for each interpolated sub-image:
      determining a complementary test sub-image having a location within the high-resolution test image being the same location as a location of the interpolated sub-image within the interpolated image; and
      mapping the interpolated sub-image to one pixel of the complementary test sub-image.

4. The method of claim 3, wherein the one pixel of the test sub-image is positioned in the center of the test sub-image.

5. The method of claim 1, wherein the data processing hardware is supported by a vehicle.

6. The method of claim 1, wherein the second image size of the interpolated image is double the first image size of the low-resolution image.

7. The method of claim 1, wherein the data processing hardware comprises a neural network.

8. A system for generating a super-resolved high-resolution image based on a low-resolution image, the system comprising:
   a user interface;
   data processing hardware in communication with the user interface; and
   memory hardware in communication with the processing hardware, the memory hardware storing instruction that when executed cause the data processing hardware to execute a method, the method includes:
      during a training phase:
         receiving one or more high-resolution test images;
         downsizing the one or more high-resolution test images into a low-resolution test image having a low-resolution image size that is less than an image size of the one or more test high-resolution images;
         interpolating the one or more low-resolution images into one or more interpolated images having an interpolated image size that is equal to the image size of the one or more high-resolution test images;
         mapping an interpolated sub-image of the interpolated image having a number of pixels to a pixel of a test sub-image of the high-resolution test image; and
         generating a model data comprising mapped data of the interpolated sub-image to the pixel of the test sub-image;
         storing the model data at the hardware memory;
      during an execution phase:
         receiving a low-resolution image having a first image size from a camera in communication with the data processing hardware;
         determining an interpolated image of the low-resolution image, the interpolated image having a second image size being greater than the first image size;
         determining a high-resolution super-resolved image based on the interpolated image and the stored model data; and transmitting a command to the user interface causing the user interface to display the high-resolution super-resolved image.

9. The system of claim 8, wherein the model data comprises neural network weights and biases along with other neural network parameters.

10. The system of claim 8, wherein mapping the interpolated sub-image to a pixel of the test sub-image, further comprises:
- dividing the interpolated image into interpolated sub-images;
- dividing the high-resolution test image into test sub-images;
- for each interpolated sub-image:
  - determining a complementary test sub-image having a location within the high-resolution test image being the same location as a location of the interpolated sub-image within the interpolated image; and
  - mapping the interpolated sub-image to one pixel of the complementary test sub-image.

11. The system of claim 8, wherein the one pixel of the test sub-image is positioned in the center of the test sub-image.

12. The system of claim 8, wherein the data processing hardware is supported by a vehicle.

13. The system of claim 8, wherein the second image size of the interpolated image is double the first image size of the low-resolution image.

14. The system of claim 8, wherein the data processing hardware comprises a neural network.

* * * * *